United States Patent
Hemed et al.

(10) Patent No.: US 9,015,337 B2
(45) Date of Patent: Apr. 21, 2015

(54) SYSTEMS, METHODS, AND APPARATUS FOR STREAM CLIENT EMULATORS

(75) Inventors: Nir Hemed, Yehud (IL); Ithai Levi, Shoham (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 531 days.

(21) Appl. No.: 13/182,089

(22) Filed: Jul. 13, 2011

(65) Prior Publication Data

US 2013/0019023 A1 Jan. 17, 2013

(51) Int. Cl.
- G06F 15/16 (2006.01)
- H04L 29/06 (2006.01)
- H04L 12/26 (2006.01)
- H04N 21/442 (2011.01)
- H04N 21/647 (2011.01)

(52) U.S. Cl.
CPC ............ *H04L 65/4069* (2013.01); *H04L 43/50* (2013.01); *H04N 21/44209* (2013.01); *H04N 21/64738* (2013.01); *H04L 65/80* (2013.01)

(58) Field of Classification Search
USPC .............. 709/224, 231; 370/252, 389; 710/60
See application file for complete search history.

(56) References Cited

U.S. PATENT DOCUMENTS

| | | | |
|---|---|---|---|
| 7,228,535 B2 | 6/2007 | Frossard et al. | |
| 7,260,640 B1 | 8/2007 | Kramer et al. | |
| 7,424,528 B2 | 9/2008 | Cherkasova et al. | |
| 7,720,983 B2 | 5/2010 | Klemets et al. | |
| 7,940,685 B1* | 5/2011 | Breslau et al. | 370/251 |
| 8,031,623 B2* | 10/2011 | Beeson et al. | 370/252 |
| 2008/0279183 A1* | 11/2008 | Wiley et al. | 370/389 |
| 2009/0113087 A1* | 4/2009 | Kohinata et al. | 710/60 |

FOREIGN PATENT DOCUMENTS

| | | |
|---|---|---|
| CN | 101080508 | 12/2007 |
| CN | 101741634 | 6/2010 |

OTHER PUBLICATIONS

Fecheyr-Lippens, Andrew, "A Review of HTTP Live Strearning", [online], Jan. 2010 [retrieved on May 17, 2011], pp. 1-37. Retrieved from the Internet: <URL: http://andrewsblog.org/a_review_of_ http_live_pdf>.

* cited by examiner

*Primary Examiner* — Kyung H Shin
(74) *Attorney, Agent, or Firm* — Hewlett-Packard Patent Department (57) ABSTRACT

In one implementation, a stream client emulator includes a stream access module and a monitor module. The stream access module receives stream data from a streaming service and consumes the stream data according to an output rate of a stream without outputting the stream data. The monitor module determines that buffer events have occurred relative to the stream data and a buffer characteristic.

20 Claims, 5 Drawing Sheets

FIG. 6 though the stream client emulators do not output the streams on the stream client emulators.

SYSTEMS, METHODS, AND APPARATUS FOR STREAM CLIENT EMULATORS

BACKGROUND

Load testing of a streaming service involves employing multiple streaming clients to access the streaming service to determine how well the streaming server performs under the load of the streaming client (e.g., how well the streaming service provides streams to—or services—the streaming clients). For example, performance measurements of buffering times or durations, jitter, and buffering delays can be recorded for the streaming service and/or each streaming client. The performance measurements can then be analyzed to quantify or qualify the performance of the streaming service.

DETAILED DESCRIPTION

A load or performance test of a streaming service typically includes multiple streaming clients requesting streams from a streaming service. The streaming clients receive, process, and output the requested streams, and are monitored to determine (e.g., qualify or quantify) how well the streaming service provides the requested streams to the streaming clients. For example, disruption of a stream (e.g., a pause for buffering) because the streaming service is not providing or delivering that stream to one or more streaming clients can indicate that the streaming service does not have enough processing, network, or memory capacity to service those streaming clients.

Typically, a stream is provided by a streaming service (or received at or delivered to a streaming client) at a rate (or delivery rate) that is different from the output rate of the stream (i.e., the rate at which the stream is output by the streaming client), and buffering is used to allow the stream to be output continuously at the streaming client. That is, the stream data from the stream are temporarily stored or cached at a buffer (or buffered at a portion of a memory) before they are output to allow continuous output of the stream at a designated or negotiated output rate. Although buffering can mitigate complications arising from different delivery rates and output rates of streams, buffers can become empty, overflow, or suffer from other buffer faults.

For example, if the buffer becomes empty (e.g., the stream is delivered at a rate below the output rate of the stream for a sufficient period of time to allow all the stream data in the buffer to be output), the streaming client has no stream data to output and ceases to output (or pauses) the stream. As another example, if the buffer overflows (e.g., the stream is delivered at a rate above the output rate of the stream for a sufficient period of time to allow the buffer to not have enough space for received stream data), stream data can be lost (e.g., discarded by a stream client because there is no space in the buffer for the stream data). As a result, the streaming client is unable to output the lost portion of the stream. Load tests of streaming services and/or communications links via which streaming services are operatively coupled to streaming clients can detect or determine to what degree or extent those streaming services can provide streams to streaming clients without such buffer faults. As a specific example, load tests of a streaming service can determine a number of streaming client a streaming service can service (e.g., deliver streams to without buffer faults).

Load or performance testing of a streaming service can be complicated by the computing resources (e.g., processor time, memory, and energy) used by streaming clients to output a stream received from the streaming service. For example, the streaming service can provide video streams to streaming clients. The streaming clients that are used to request video streams from the streaming service (or to generate the load on the streaming service) receive data from the stream (or stream data), and output the stream data as audio and video frames. More specifically, for example, the streaming clients decompress and decode the stream data, which in this example are frames of a video and related audio, and then render and playback the video frames and related audio at a display and speaker, respectively.

Because the streaming clients require computing resource to output (e.g., render, display, playback, etc.) stream data received from a streaming service, a load generation system used to host the streaming clients and perform the load testing can require a significant amount of computing resources. Providing adequate computing resources to perform load tests of streaming services can be expensive.

Implementations discussed herein perform efficient load testing of streaming services. More specifically, implementations discussed herein utilize stream client emulators rather than streaming clients to perform load tests of streaming services. From the perspective of the streaming service, the stream client emulators appear as conventional streaming clients. For example, the stream client emulators communicate with a streaming service using the same protocols, commands, instructions, and messages used by streaming clients to communication with that streaming service.

Moreover, stream client emulators have similar behaviors or properties such as buffer characteristics to those of conventional streaming clients. A buffer characteristic is a property or behavior of a buffer. As an example, a buffer size (e.g., the number of bytes that can be stored at a buffer) and a buffer threshold are buffer characteristics. As an example, a stream client emulator can stop consuming (or pause) a video stream if the number of bytes in a pseudobuffer decreases below one threshold of a buffer at a conventional streaming client, and start consuming the video stream when the number of bytes in the pseudobuffer increases above another threshold of the buffer of that conventional streaming client. A pseudobuffer includes a representation (e.g., a counter) of a quantity of stream data received and not yet consumed, and includes buffer characteristics (e.g., size or capacity limitations and thresholds) that emulate the characteristics of a buffer at a streaming client.

Furthermore, in some implementations, stream client emulators identify themselves to a streaming service as streaming clients. Accordingly, the stream client emulators can request streams from a streaming service, and the streaming service provides the streams as though the stream client emulators were actual streaming clients. Because the stream client emulators appear to a streaming service to be clients, the effect of a number of stream client emulators of the streaming service can accurately represent the effect of that number of streaming clients on the streaming service.

The stream client emulators do not, however, replicate all the functionalities of streaming clients. For example, in some implementations, a stream client emulator does not process (e.g., interpret or decode) or output stream data. Rather, the stream client emulator maintains a pseudobuffer that represents or emulates a buffer of a streaming client. The pseudobuffer can represent buffer characteristics of a streaming client and a quantity of stream data received from a streaming service that is periodically reduced based on an output rate of the stream including the stream data.

The output rate of the stream is a rate at which stream data from the stream should be consumed. A streaming client consumes stream data by outputting the stream data. For example, a playback rate of a multimedia stream in bits per second, bytes per second, or frames per second is an output rate. A stream client emulator consumes stream data by discarding, rather than outputting, the stream data and decreasing a pseudobuffer (or stream data counter of a pseudobuffer) according to or at the output rate of the stream or stream data. In some implementations, the stream data are discarded at the output rate and the pseudobuffer is decreased at the output rate. In other implementations, and the pseudobuffer is decreased at the output rate and the stream data are discarded at a different rate (e.g., stream data received from a streaming service are discarded immediately after the quantity those stream data is determined).

Accordingly, for example, rather than decompress, decode, render, store for output, and playback stream data received from a streaming service, a stream client emulator discards received stream data and maintains a stream data counter (e.g., at a pseudobuffer) that represents a quantity of stream data that has been received and not yet consumed (or discarded) according to (or at) the output rate of the stream. More specifically, for example, the stream client emulator receives a quantity stream data, increases a stream data counter by the quantity of stream data received, discards the stream data without outputting the stream data, and decreases the stream data counter according to the output data rate of the stream.

In other implementations, a stream client emulator can process (e.g., decompress, decode, and/or interpret) stream data, but does not output the stream data. As an example, an output rate or other information about a stream can be included within stream data of that stream. A stream client emulator can decompress, decode, and/or interpret stream data to access this information, and then discard the stream data without displaying the stream data.

A pseudobuffer of each stream client emulator is monitored to determine how well the streaming service is performing relative to that stream client emulator. For example, a stream data counter (or thereof) at a pseudobuffer can be monitored for buffer events. A buffer event, as used herein, is an event or condition that is indicative of the status of a buffer. For example, events related to conditions of a buffer and/or buffer faults are buffer events. As more specific examples, buffer events include buffer full events (e.g., a stream data counter meets or exceeds a threshold), buffer empty events (e.g., a stream data counter is zero or falls below a threshold), buffer filling while consumption of a stream is stopped or paused events (e.g., stream data is being received while the stream client emulator is not consuming stream data because a stream data counter decreased below a stop threshold and has not increased above a start threshold), buffer filling while consuming a stream event, (e.g., stream data is being received from the streaming service at a higher rate than the output rate—or faster than the stream data is being consumed), or other buffer events. The buffer events can be provided to an analysis module to aggregate the buffer events from multiple stream client emulators, and analyze the performance of the streaming service based on the buffer events and other performance measures.

Because implementations discussed herein do not output stream data, load testing of streaming services can be accomplished using fewer computing resources at a load generation system hosting stream client emulators than at a load generation system hosting streaming client. Moreover, because stream data is not stored at a buffer (e.g., a portion of a memory) before being output, stream client emulators can operate using less memory that streaming clients. Thus, load testing can be performed at reduced cost and at greater scale (e.g., the load for a streaming service can be generated using more stream client emulators).

As used herein, the singular forms "a," "an," and "the" include plural referents unless the context clearly dictates otherwise. Thus, for example, the term "stream client emulator" is intended to mean one or more stream client emulators or a combination of stream client emulators. Additionally, as used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted or at a processor), or hardware and software hosted at hardware.

Figure 1:
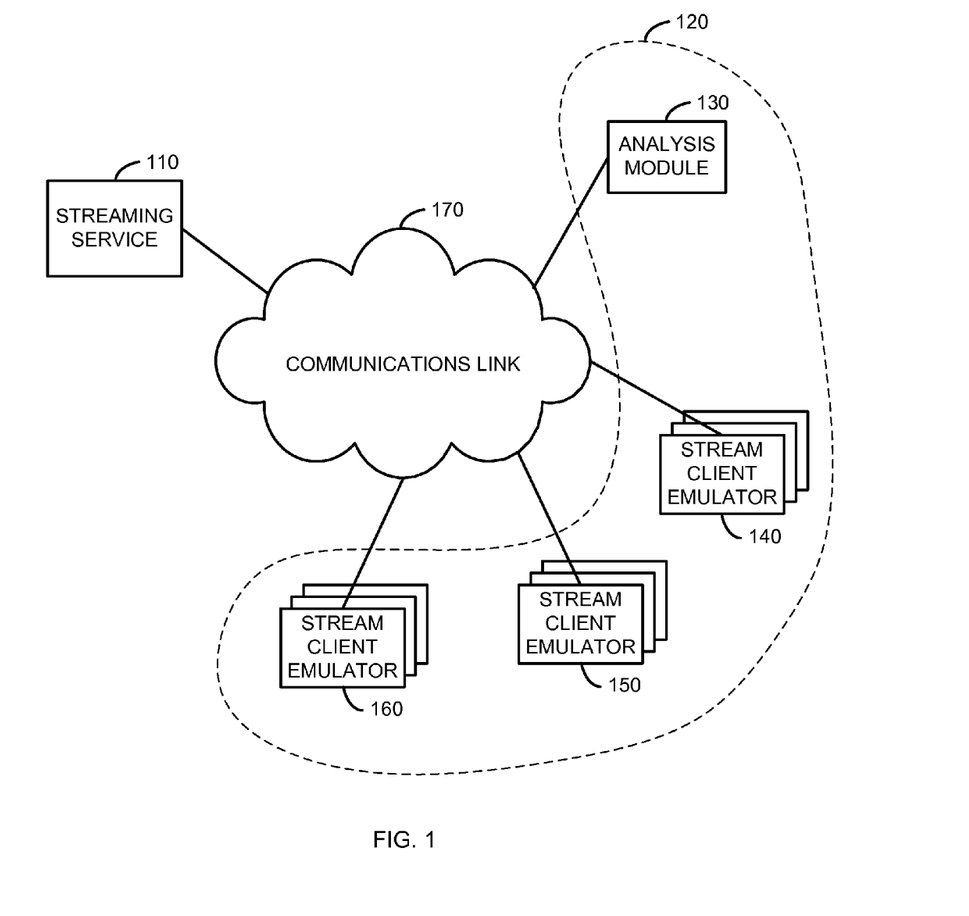
FIG. 1 is an illustration of an environment for load testing a streaming service, according to an implementation.

FIG. 1 is an illustration of an environment for load testing a streaming service, according to an implementation. The environment illustrated in FIG. 1 includes streaming service 110, communications link 170, and load generation system 120. Load generation system 120 includes analysis module 130, stream client emulators 140, stream client emulators 150, and stream client emulators 160. In some implementations, an environment for load testing a streaming service can also include a controller or control module in communication with a load generation system or portions thereof (e.g., with stream client emulators of a load generation system). The controller can receive real time information (e.g., information received during a load test of the streaming service) from the load generation system or portions thereof related to the performance of the streaming service. Additionally, the controller can output (e.g., to a display or other output device) the real time information.

Communications link 170 includes devices, services, or combinations thereof that define a communications path between streaming service 110, analysis module 130, stream client emulators 140, stream client emulators 150, and stream client emulators 160, or other devices or services. For example, communications link 170 can include one or more of a cable (e.g., twisted-pair cable, coaxial cable, or fiber optic cable), a wireless link (e.g., radio-frequency link, optical link, or sonic link), or any other connectors or systems that transmit or support transmission of signals. Communications link 170 can include communications networks such as an intranet, the Internet, telecommunications networks, or a combination thereof. Additionally, communications link 170 can include proxies, routers, switches, gateways, bridges, load balancers, and similar communications devices. Furthermore, the connections or communications paths illustrated in FIG. 1 are logical and do not necessarily reflect physical connections. As an example, analysis module 130 and stream client emulators 140, 150, and 160 can be hosted at a common (i.e., at the same) computing device or at different computing devices.

Streaming service 110 is a service that provides resources to streaming clients using streaming. Streaming is a methodology of providing or accessing resources in which a provider (e.g., streaming service 110) delivers a resource to a consumer (e.g., a streaming client) in a way that allows the consumer to process portions of the resource while other portions of the resource are being received at the consumer. In other words, the consumer can consume the resource to the extent the resource has been received (or delivered or provided) before the entire resource has been received. Resources that are provided using streaming can be referred to as streams.

Many types or classes of resources can be provided as streams. For example, multimedia files such as audio files and video files can be provided to streaming clients as streams. Additionally, document files such as word processing files, spreadsheet files, image files, and other files can be provided as streams. Moreover, resources provided as streams need not be wholly defined before being streamed (or provided as a stream). As an example, a live video feed generated at a video camera can be provided to streaming clients as a stream.

Furthermore, a stream or portions thereof can be influenced by or defined in response to input such as commands from a streaming client. For example, services and applications can be provided as streams. As specific examples, a streaming service can provide a computer game or a word-processing application to a streaming client as a stream. The streaming service receives commands from a streaming client and provides, for example, screen images and sound to the streaming client in response to the commands.

Streaming service 110 can be hosted or executed at, for example, a computing device such as a computing server. Alternatively, streaming service 110 can be hosted at a virtual machine. In some implementations, streaming service 110 is an application-specific computing device or appliance. That is, streaming device 110 can include specialized hardware devices such as audio, video, cryptographic, compression, coding, or other accelerators that are useful to streaming service 110 or streams provided by streaming service 110. As a specific example, streaming service 110 can be (or be hosted at) a multimedia streaming appliance that includes audio and video compression accelerators, a minimal or just enough operating system, and a combination of hardware and software to implement streaming service 110. Furthermore, in some implementations, streaming service 110 is a group, cluster, or network of streaming services.

Load generation system 120 accesses streaming service 110 via communications link 170 to perform load or performance tests of streaming service 110. More specifically, for example, stream client emulators 140, 150, and 160 request streams at streaming service 110, monitor the delivery and consumption of the streams, and provide information related to the delivery and consumption of the streams to analysis module 130. Analysis module 130 then aggregates this information to generate results or analytics that describe, qualify, or quantify, for example, the performance of streaming service 110 during the load test. In some implementations, a load generation system can include dozens, hundreds, or thousands of stream client emulators. Each stream client emulator requests, receives, and consumes streams from the streaming service to generate at load and test the streaming service. Furthermore, each stream client emulator provides information related to the delivery and consumption of a stream or streams at that stream client emulator to analysis module 130.

Additionally, analysis module 130 can output the results or analytics that describe, qualify, or quantify, for example, the performance of streaming service 110 during the load test. For example, analysis module 130 can include an interface via which reports including these results or analytics can be requested. As used herein, a report is a collection of information describing or providing an account of results or analytics related to a load test (e.g., performance of a streaming service or operation of one or more stream client emulators). As a specific example, analysis module 130 can include a web-based (e.g., Hypertext Transfer Protocol (HTTP)) interface via which users (via web browsers) can request reports such as web pages including textual (e.g., text and tables), graphical (e.g., graphs and images), or other representations of information related to the delivery and consumption of one or more streams at stream client emulators 140, 150, and/or 160. Such information can include aggregated information from multiple client emulators (e.g., mean, median, maximum, and minimum data rates for all of stream client emulators 140, 150, and/or 160) and/or information for each client emulator (e.g., mean, median, maximum, and minimum data rates for each of stream client emulators 140, 150, and/or 160). Because each stream client emulator represents a streaming client, such information can describe the performance of streaming service 110 to each of a group of users of streaming service 110.

Figure 2:
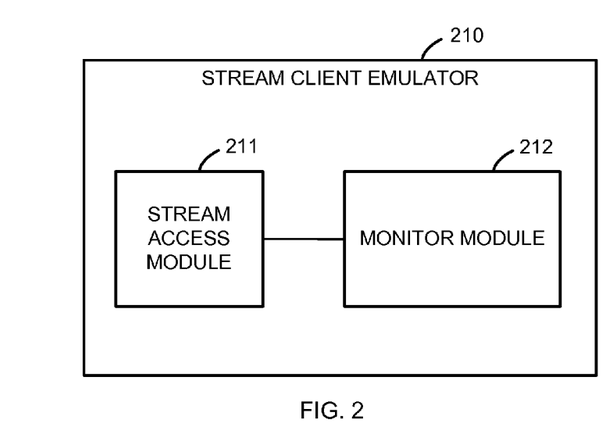
FIG. 2 is a schematic block diagram of a stream client emulator, according to an implementation.
Figure 3:
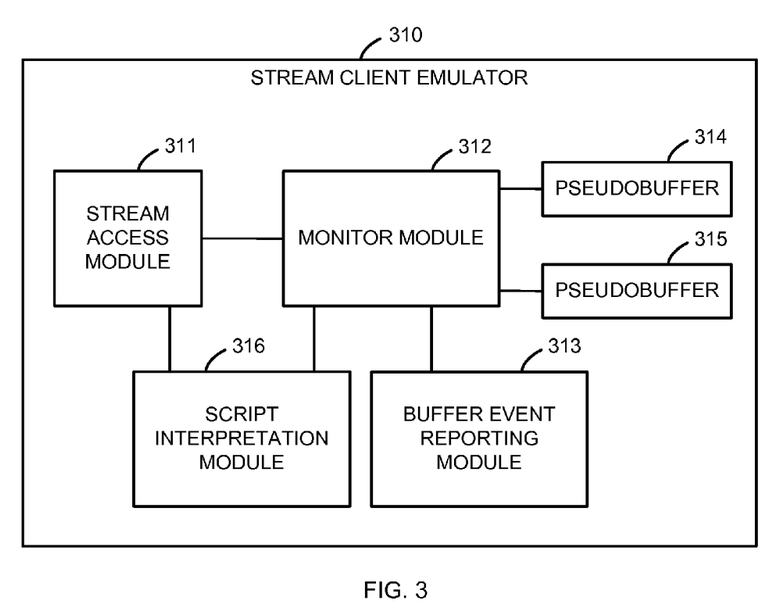
FIG. 3 is a schematic block diagram of a stream client emulator, according to another implementation.

Examples of stream client emulators 140, 150, and 160 are illustrated in FIGS. 2 and 3. Although various modules are illustrated and discussed below in relation to FIGS. 2 and 3, other combinations or sub-combinations of modules can be included within stream client emulators. Said differently, although the modules discussed below in relation to FIGS. 2 and 3 perform specific functionalities in these illustrated examples, these and other functionalities can be accomplished at different modules or at combinations of modules. For example, two or more modules illustrated as separate can be combined into a module that performs the functionalities discussed in relation to the two modules. As another example, functionalities performed at one module as discussed in relation to these examples can be performed at a different module or different modules.

FIG. 2 is a schematic block diagram of a stream client emulator, according to an implementation. Stream client emulator 210 includes stream access module 211 and monitor module 212. Stream access module 211 accesses streams at streaming services using the same protocols, commands, instructions, and messages as streaming clients of those streaming services. As a specific example, stream access module 211 requests streams from a streaming service using the same protocol as a streaming client of that streaming service, and receives the requested streams from the streaming service. In other words, access module 211 emulates a streaming client to a streaming service.

Monitor module 212 monitors the amount of stream data (i.e., data included in a requested stream) that is available (or received and not yet consumed) at stream client emulator. Monitor module 212 does not store the stream data for outputting. Rather, monitor module 212 increases a stream data counter by an amount equal to the quantity of stream data received at stream access module 211. For example, after stream access module receives a number of bytes of stream data, monitor module 212 increases the stream data counter by that number. In other implementations, after stream access module receives a number of bytes of stream data, monitor module 212 can discard any header and/or protocol information or control messages and then increase the stream data counter by the number of remaining bytes. For example, the remaining bytes can be audio and/or video data that would be output by a streaming client.

Additionally, monitor module 212 decreases the stream data counter according to an output rate of the stream being received at stream access module 211. As an example, a stream can have an output rate of 800 kilobits per second. Each time bytes of stream data are received at stream access module 211, monitor module 212 increases a stream data counter by the number of bytes of stream data received. Monitor module 212 decreases the stream data counter at the output rate, here, of 800 kilobits per second. For example, at a time interval or period, monitor module 212 reduces the stream data counter by an amount proportional to the interval and the output rate. More specifically, as an example, the interval can be one millisecond. Accordingly, monitor module 212 reduces the stream data counter by one one-thousandth of the output rate each millisecond. That is, monitor module 212 reduces the stream data counter by 800 bits (or 100 bytes) each millisecond. In other implementations, the stream data counter can be reduced at different intervals (e.g., every second, every microsecond, or every ten milliseconds) or continuously.

Monitor module 212 also determines whether buffer events have occurred relative to the stream (or stream data or stream data counter) and one or more buffer characteristics. For example, each time pseudobuffer monitor 212 increases or decreases the stream data counter (or at other times), pseudobuffer monitor 212 compares the value of the stream data counter with buffer characteristics (e.g., a maximum buffer threshold and a minimum buffer threshold) and detects a buffer event if one or more conditions associated with (or related to) that buffer event are satisfied. As a specific example, a buffer characteristic can be the size of a buffer of a stream client represented or emulated by stream client emulator 210. A buffer full event can be detected if the stream data counter (or the value of the stream data counter) is equal to or greater than the buffer characteristic. As another example, a buffer empty event can be detected if the stream data counter is reduced to or below zero. As yet another example, a buffer filling (e.g., buffering) event can be detected if the stream data counter is below a threshold.

FIG. 3 is a schematic block diagram of a stream client emulator, according to another implementation. Stream client emulator 310 includes stream access module 311, monitor module 312, pseudobuffer 314, pseudobuffer 315, buffer event reporting module 313, and script interpretation module 316. Stream access module 311 and monitor module 312 are similar to stream access module 211 and monitor module 212 illustrated in FIG. 2.

As illustrated in FIG. 3, monitor module 312 monitors pseudobuffers 314 and 315 to determine whether buffer events have occurred relative to the stream and one or more buffer characteristics of pseudobuffers 314 and 315. In some implementations, a stream client emulator includes a monitor module for each pseudobuffer. Pseudobuffers 314 and 315 each include a stream data counter and one or more buffer characteristics. In some implementations, pseudobuffers 314 and 315 emulate buffers of different stream clients. As an example, stream client emulator 310 can include multiple pseudobuffers and emulate buffer characteristics (e.g., properties or behaviors) of multiple stream clients by representing a buffer of each stream client with a pseudobuffer. In other words, each pseudobuffer emulates the properties and/or behaviors of a streaming client (e.g., buffer size, a minimum buffer threshold at which the streaming client will output stream data, or a number of buffers) without outputting stream data. In other implementations, pseudobuffers 314 and 315 emulate different buffers of a stream client. For example, a single streaming client can include multiple buffers, and stream client emulator 310 can emulate buffer properties or behaviors of that stream client by representing each buffer of the stream client with a pseudobuffer.

Monitor module 312 provides signals, commands, or other information related to buffer events that have occurred relative to the stream and one or more buffer characteristics of pseudobuffers 314 and 315 to buffer event reporting module 313. Buffer event reporting module 313 generates buffer event notifications related to those buffer events, and provides those buffer event notifications to, for example, an analysis module. In other words, buffer event reporting module 313 receives the signals, commands, or other information related to buffer events, and generates an associated buffer event notification or forwards the signals, commands, or other information as buffer event notifications.

Buffer event notifications describe or identify a buffer event. Additionally, buffer event notification can identify or describe, for example, the stream client emulator or pseudobuffer at which the buffer event occurred, a time at which the buffer event occurred, and or a value related to the buffer event (e.g., a number seconds during which a buffer filling event persisted). Moreover, buffer event notifications can be signals, structured data (e.g., a buffer event notification can be expressed in a markup language such as the Extensible Markup Language ("XML")), unstructured data, or other notifications that identify and/or describe a buffer event.

Buffer event reporting module 313 can provide the buffer event notifications by sending the buffer event notifications or by storing the buffer event notifications at a location or resource at which they can later be retrieved. For example, buffer event reporting module 313 can store the buffer event notifications at a mailbox (e.g., an electronic mailbox) at which an analysis module, for example, can access the buffer event notifications. In some implementations, buffer event reporting module 313 can send the buffer event notifications to a mailbox system or other intermediary at which an analysis module can access the buffer event notifications. In yet other implementations, buffer event reporting module 313 can send the buffer event notifications directly to an analysis module. Furthermore, in some implementations, an analysis module can request the buffer event notifications at buffer event reporting module 313, and buffer event reporting module 313 can send the buffer event notifications to the analysis module in response to the request. In other words, buffer event notifications can be provided using various methodologies including push and pull methodologies.

Script interpretation module 316 interprets scripts describing actions or operations of a streaming client relative to a stream (or to a streaming service from which the streaming client requests and/or receives a stream), and communicates with stream access module 311 to request the actions or operations at a streaming service. For example, a script interpreted at script interpretation module 316 can describe requests, instructions, or commands sent from a streaming client to the streaming service that alter, modify, or otherwise affect a stream. Script interpretation module 316 can provide signals, commands, or instructions to stream access module 311 to cause stream access module 311 to provide these requests or commands to a streaming service.

As a more specific example, stream client emulator 310 can access a video stream at a video streaming service. While a requested video stream is streaming to stream client emulator 310 (e.g., being received at stream access module 311), script interpretation module 316 can determine that a script includes a command to perform a fast forward operation, a rewind operation, a scrub forward operation, a scrub backward operation, a pause operation, or other operation relative to the video stream. That is, the script includes an instruction to fast forward, rewind, scrub, or pause, for example, the video stream. Script interpretation module 316 can provide a signal or command to cause stream access module 311 to request the operation at the video streaming service using a protocol used by streaming clients of the video streaming service to request the operation.

Furthermore, a script can affect an output rate of a stream or pseudobuffer associated with a stream (e.g., a stream data counter at the pseudobuffer that is increased when stream data from that stream are received and is decreased according to the output rate of that stream). For example, a fast forward instruction or command at the script can temporarily increase the output rate of the stream. As a result of the temporarily increased output rate, a stream data counter at the pseudobuffer is decreased or reduced more rapidly than according to the usual output rate of the stream. Thus, in some implementations, script interpretation module 316 provides signals, commands, or instructions to monitor module 312 to modify or affect an output rate of a stream or a pseudobuffer.

In other implementations, script interpretation module 316 can interpret scripts related to different types or classes of streams. For example, a script can describe a user's actions or operations related to a computer game stream. That is, the script can describe the operations performed by the user, and the script interpretation module 316 interprets instructions related to those operations, and replays those operations via stream access module 311 (e.g., stream access module 311 sends commands to a streaming service based on signals related to those operations received from script interpretation module 316).

In some implementations, scripts can be generated randomly or by load test administrators to test particular aspects of a streaming service. In other implementations, scripts can be recorded while users access and interact with a streaming service (or a stream provided by the streaming service). In yet other implementations, scripts can be recorded and then modified by test administrators. Thus, stream client emulator 310 (or a load generation system including stream client emulator 310) can generate a load at one or more streaming services by interpreting scripts (or script files) that describe operations on or relative to streams provided by the one or more streaming services and performing those operations. Such scripts allow a load generation system to determine the performance of a streaming service under realistic conditions or loads without providing the computing resources to support conventional streaming clients.

Figure 4:
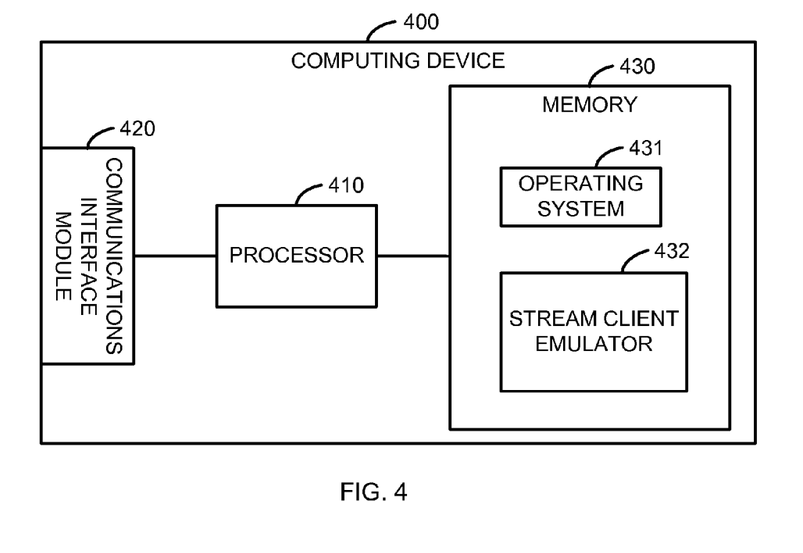
FIG. 4 is a schematic block diagram of a computing device configured as a stream client emulator, according to an implementation.

FIG. 4 is a schematic block diagram of a computing device configured as a stream client emulator, according to an implementation. In other words, computing device 400 is configured as a stream client emulator (or referred to as a stream client emulator) because it hosts stream client emulator 432. Computing device 400 includes processor 410, communications interface module 420, and memory 430. Processor 410 is any combination of hardware and software that executes or interprets instructions, codes, or signals. For example, processor 410 can be a microprocessor, an application-specific integrated circuit ("ASIC"), a distributed processor such as a cluster or network of processors or computing device, or a virtual machine.

Communications interface module 420 is a module in communication with processor 410 via which computing device 400 communicates (e.g., exchange symbols or signals representing data or information) with other computing devices and/or services via, for example, a communications link. Communications interface module 420 can include hardware (e.g., pins, connectors, or integrated circuits) and software (e.g., drivers or communications stacks). For example, communications interface module 420 can implement an electrical communications interface, an optical communications interface, a wireless communications interface, an Ethernet interface, a Fiber Channel interface, an InfiniBand interface, or another communications interface.

Memory 430 is a non-transitory processor-readable medium that stores instructions, codes, data, or other information. For example, memory 430 can be a volatile random access memory ("RAM"), a persistent data store such as a hard disk drive or a solid-state drive, or a combination thereof or other memories. Furthermore, memory 430 can be integrated with processor 410, separate from processor 410, or external to computing device 400.

As illustrated in FIG. 4, memory 430 includes operating system 431 and stream client emulator 432. Operating system 431 and stream client emulator 432 are each instructions or code that—when executed at processor 410—cause processor 410 to perform operations that implement, respectively, operating system 431 and stream client emulator 432. Said differently, operating system 431 and stream client emulator 432 are hosted at computing device 400.

In some implementations, computing device 400 can be a virtualized computing device. For example, computing device 400 can be hosted as a virtual machine at a computing server. Moreover, in some implementations, computing device 400 can be a virtualized computing appliance, and operating system 431 is a minimal or just-enough operating system to support stream client emulator 432.

Stream client emulator 432 can be accessed or installed at computing device 400 from a variety of memories or processor-readable media. For example, computing device 400 can access a remote processor-readable medium via communications interface module 420 and access stream client emulator 432 at that processor-readable medium. As a specific example, computing device 400 can be a thin client that accesses operating system 431 and stream client emulator 432 during a boot sequence.

As another example, computing device 400 can include (not illustrated in FIG. 4) a processor-readable medium access device (e.g., a compact disc ("CD"), digital video disc ("DVD"), Secure Digital™ ("SD"), MultiMediaCard ("MMC"), or a CompactFlash™ ("CF") drive or reader) and access stream client emulator 432 at a processor-readable medium via that processor-readable medium access device. As a more specific example, the processor-readable medium access device can be a DVD drive at which a DVD including an installation package for stream client emulator 432 is accessible. In other implementations, the installation package can be downloaded from another computing device or service such as a computer server. The installation package can be executed or interpreted at processor 410 to install stream client emulator 432 at computing device 400 (e.g., at memory 430). Computing device 400 can then host or execute stream client emulator 432.

Figure 5:
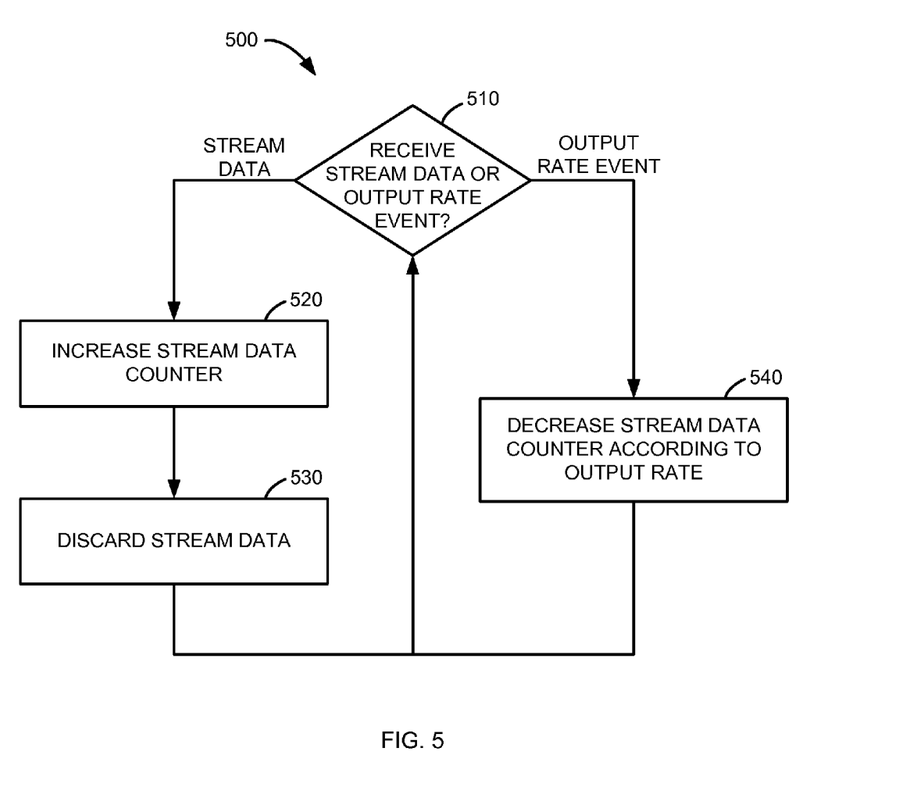
FIG. 5 is a flowchart of a stream client emulation process, according to an implementation.

FIG. 5 is a flowchart of a stream client emulation process, according to an implementation. Process 500 waits at block 510 for stream data or an output rate event. If stream data is received at block 510, process 500 proceeds to block 520 at which a stream data counter is increased. For example, a stream data counter can be incremented by a value of one for each byte of stream data received at block 510. The stream data received at block 510 is then discarded at block 530. For example, memory at which the stream data are stored can be marked as empty and allowed to be overwritten. As another example, a data pointer can be modified or moved to overwrite the stream data received at block 510. After the stream data is discarded, process 500 proceeds to block 510 at which process 500 waits for additional stream data or an output rate event.

In some implementations, the stream data received at block 510 can be discarded before block 520. For example, the stream data can be discarded as they are received from a streaming service, and a count representing the quantity of stream data received from the streaming service can be maintained. The stream data counter can then be increased by that count or quantity at block 520.

If an output rate event is detected at block 510, process 500 proceeds to block 540 at which the stream data counter is decreased according to the output rate of the stream from which stream data are received at block 510. An output rate event is an event or signal that indicates the stream data counter should be decreased or reduced according to an output rate of a stream. For example, an output rate event can be the expiration of a timer or a signal generated periodically. As a specific example, the output rate event can be a signal generated every millisecond. In response to the signal generated every millisecond, process 500 proceeds from block 510 to block 540 and decreases the stream data counter by a portion of the output rate of the stream relative or proportional to one millisecond. As an example, if the output rate is 400 kilobits per second, the stream data counter is reduced by 400 bits at block 540 each millisecond.

In some implementations, the stream data counter represents one quantum of stream data and the output rate is expressed in a different quantum. In such implementations, the stream data counter can be appropriately reduced to account for the different quanta. For example, the output rate can be 400 kilobits per second, the stream data counter can represent a number of bytes received from a streaming service, and an output rate event can occur periodically at one millisecond intervals. The stream data counter then reduced by 50 bytes at block 540 each millisecond. After the stream data counter is decreased at block 540, process 500 returns to block 510.

In some implementations, process 500 can be realized at a computing device within a single thread of execution. That is, only one block of blocks 510, 520, 530, and 540 is performed at any given time. In other implementations, process 500 can be realized at a computing device within multiple threads of execution. In other words, two or more of blocks 510, 520, 530, and 540 can be performed currently. As a specific example, block 510 can be performed in one thread of execution, blocks 520 and 530 can be performed in another thread of execution, and block 540 can be performed in yet another thread of execution. In some such implementations, resources shared by multiple threads of execution such as, for example, a stream data counter, can be accessed within critical or protected sections of the multiple threads of execution to preserve integrity of those resources.

Figure 6:
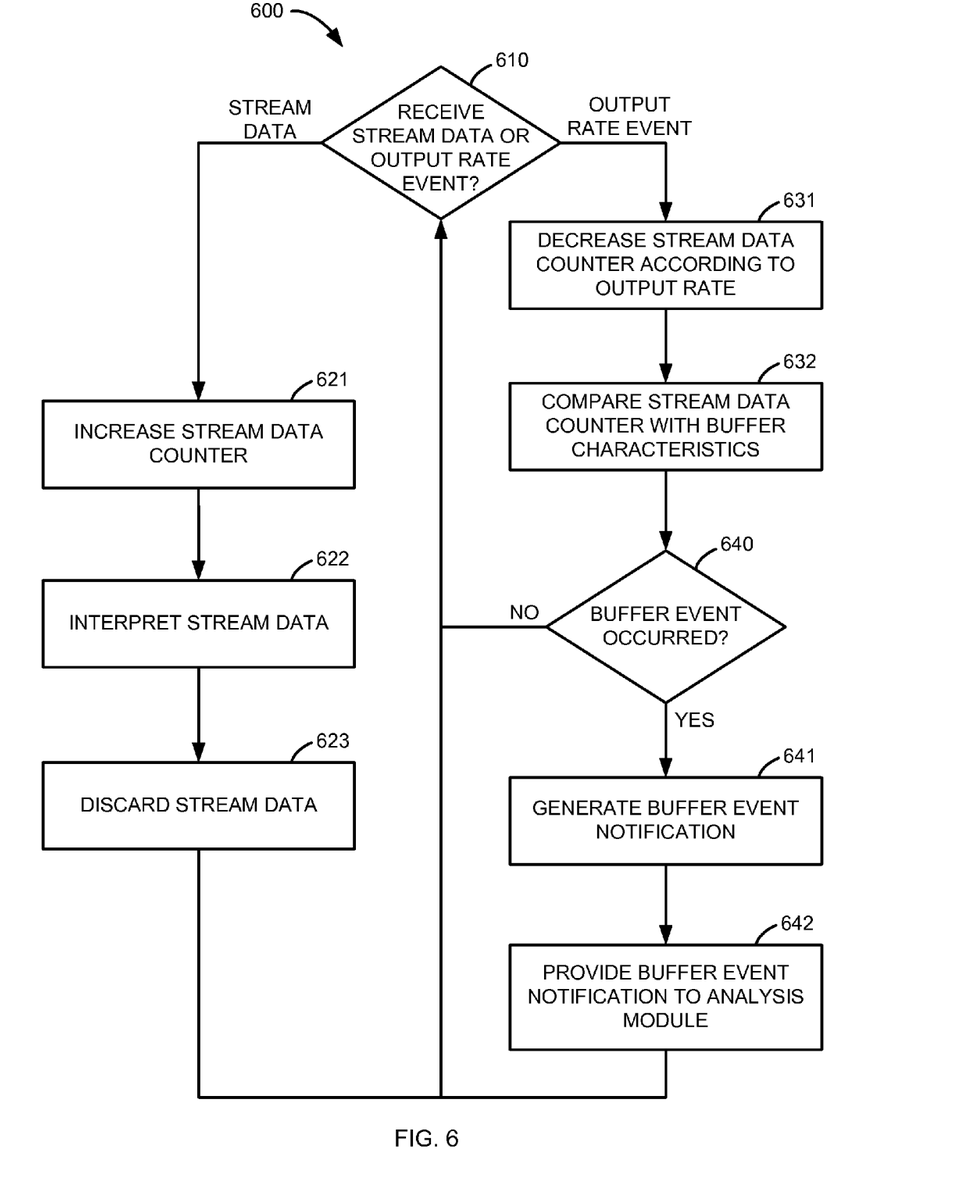
FIG. 6 is a flowchart of a stream client emulation process, according to another implementation.

FIG. 6 is a flowchart of a stream client emulation process, according to another implementation. Process 600 waits at block 610 for stream data or an output rate event. When stream data is received at block 610, for example from a streaming service providing a stream to a stream client emulator implementing process 600, process 600 proceeds to block 621 at which a stream data counter associated with a stream from which the stream data is received at block 610 is increased based on the quantity of stream data received at block 610.

The stream data is then interpreted at block 622. For example, the stream data can include information related to a stream. As a specific example, the stream data can include an output rate change notification that defines or describes an output rate of the stream. That is, the output rate of a stream can change in response to a data rate of a communications link or in response to a command from a stream client emulator. The streaming service providing the stream to a stream client emulator implementing process 600 can notify that stream client emulator of the new output rate by providing the new output rate within the stream data. That stream client emulator can then update, for example, an interval or period at which output rate events occur and/or a value by which the stream data counter is reduced in response to output rate events (e.g., at block 631). Said differently, the stream data (or a portion thereof) can be decoded at block 622, and a stream client emulator implementing process 600 can perform actions based on the decoded stream data. In other words, a client emulator implementing process 600 can process stream data to extract information from a stream and not output the stream. In other implementations, a streaming service can provide information associated with a stream, such as an output rate change notification, to a stream client emulator implementing process 600 out of band relative to (or separate from) the stream.

Similarly as discussed above in relation to FIG. 5, a stream client emulator implementing process 600 discards the stream data at block 623 without outputting the stream data. Process 600 then returns to block 610 and waits for additional stream data or an output rate event.

When an output rate event is detected at block 610 (or occurs), process 600 proceeds to block 631 at which the stream data counter is decreased according to the output rate of the stream. For example, the stream data counter can be decreased as discussed about in relation to FIG. 5. Moreover, as discussed above, the output rate of a stream can vary. In such implementations, the stream data counter is accordingly decreased by the current output rate of the stream at block 631.

A stream client emulator implementing process 600 then determines whether any buffer events have occurred. As an example, the stream data counter can be compared with buffer characteristics as illustrated in FIG. 6 at block 632 to determine whether a buffer event has occurred. Buffer events can occur relative to various conditions of a stream data counter and buffer characteristics. For example, if the stream data counter is less than or equal to a minimum buffer characteristic (e.g., zero or a minimum threshold of a buffer of a stream client), an empty buffer event can be detected. If the stream data counter is greater than or equal to a maximum buffer characteristic (e.g., a maximum size of a buffer of a stream client), a buffer full event or buffer overflow event can be detected. As another example, if the stream data counter is less than an output threshold (e.g., a number of bytes at which a streaming client will begin to output stream data), a buffer filling or buffering event can be detected. Furthermore, if the stream data counter is between a minimum characteristic and a maximum characteristic at block 632, a streaming buffer event can be detected.

If no buffer event is detected at block 640, process 600 proceeds to block 610 to wait for additional stream data or an output rate event. Alternatively, if one or more buffer events are detected (or occurred) at block 640, a buffer event notification is generated at block 641. As discussed above, a buffer event notification identifies and/or describes a buffer event. The buffer event notification is then provided to an analysis module (or other computing device or service) at block 642.

After the buffer event notification is provided to the analysis module, process 600 returns to block 610 to wait for additional stream data or an output rate event.

FIG. 6 illustrates a particular example of process 600. Accordingly, in other implementations, process 600 can include additional or fewer blocks, or blocks assembled in a different order than those illustrated in FIG. 6. For example, process 600 can proceed from block 623 to block 632 to determine whether one or more buffer events occurred after stream data are received at block 610. Moreover, similar to process 500, process 600 can be realized in at a computing device within one thread of execution or multiple threads of execution.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems and methods described herein can include various combinations and/or sub-combinations of the components and/or features of the different implementations described. Thus, features described with reference to one or more implementations can be combined with other implementations described herein.

What is claimed is:

1. A stream client emulator, comprising:
at least one computing device, operating in response to instructions stored in memory, comprising,
a stream access module to receive stream data from a streaming service providing a stream including the stream data and to consume the stream data according to an output rate of the stream without outputting the stream data, wherein the output rate is a rate that the stream data would be consumed by a streaming client; and
a monitor module to determine that a buffer event has occurred relative to the stream data and a buffer characteristic.

2. The stream client emulator of claim 1, wherein the stream access module is operable to request the stream from the streaming service and the stream access module excludes use of an output stream data buffer memory.

3. The stream client emulator of claim 1, wherein the monitor module is operable to generate a buffer event notification based on the buffer event.

4. The stream client emulator of claim 1, further comprising a buffer event reporting module to provide a buffer event notification based on the buffer event.

5. The stream client emulator of claim 1, wherein the stream access module is operable to interpret the stream data.

6. The stream client emulator of claim 1, wherein the stream access module is operable to consume the stream data without rendering the stream data.

7. The stream client emulator of claim 1, wherein:
the buffer characteristic is a first buffer characteristic associated with a first pseudobuffer; and
the monitor module is operable to determine that one or more buffer events have occurred relative to the stream data and a second buffer characteristic associated with a second pseudobuffer.

8. A load generation system, comprising at least one computing device, operating in response to instructions stored in memory, comprising:
a plurality of stream client emulators, each stream client emulator configured to:
receive stream data from a streaming service providing a stream including the stream data;
consume the stream data according to an output rate of the stream without outputting the stream data, wherein the output rate is a rate that the stream data would be consumed by a streaming client; and
generate a buffer event notification based on the received stream data and the output rate of the stream.

9. The load generation system of claim 8, wherein the output rate of the stream is a first output rate of the stream, and each stream client emulator is further configured to:
receive an output rate event including a second output rate of the stream; and
consume the stream data counter according to the second output rate of the stream.

10. The load generation system of claim 8, wherein each stream client emulator is further configured to consume the stream data according to an output rate of the stream without rendering the stream data and each stream client emulator excludes use of an output stream data buffer memory.

11. The load generation system of claim 8, wherein each stream client emulator is further configured to interpret the stream data before consuming the stream data.

12. The load generation system of claim 8, wherein each stream client emulator is further configured to determine the output rate of the stream from the stream data before consuming the stream data.

13. The load generation system of claim 8, wherein each stream client emulator is further configured to provide the buffer event notification to an analysis module.

14. The load generation system of claim 8, further comprising an analysis module to receive buffer event notifications from the plurality of stream client emulators and to define reports including information associated with performance of the streaming service derived in response to the received buffer event notifications.

15. A processor-readable non-transitory storage medium storing code representing processor-readable instructions that when executed by at least one processor cause the at least one processor to:
increase a stream data counter according to a quantity of stream data received from a streaming service, the streaming service providing a stream including the quantity of stream data, wherein the stream data counter represents a quantity of stream data that has been received and not yet discarded;
discard the quantity of stream data without outputting a portion of the stream associated with the quantity of stream data; and
decrease the stream data counter according to an output rate of the stream, wherein the output rate is a rate that the stream data would be consumed by a streaming client.

16. The processor-readable non-transitory storage medium of claim 15, further storing code representing instructions to cause the at least one processor to:
generate a buffer event notification based on the stream data counter and a buffer characteristic associated with the stream data counter.

17. The processor-readable non-transitory storage medium of claim 15, further storing code representing instructions to cause the at least one processor to:

compare the stream data counter with a buffer characteristic associated with an emulated stream client; and generate a buffer event notification based on the comparing.

18. The processor-readable non-transitory storage medium of claim 15, wherein:

the stream is received from the streaming service at a rate different from the output rate of the stream.

19. The processor-readable non-transitory storage medium of claim 15, further storing code representing instructions to cause the at least one processor to:

decode the quantity of stream data before the discarding without rendering the quantity of stream data to a user.

20. The processor-readable non-transitory storage medium of claim 15, wherein the output rate is a first output rate of the stream and the decreasing the stream data counter according to the first output rate of the stream is during a first period, further storing code representing instructions to cause the at least one processor to:

receive an output rate change notification associated with a second output rate of the stream; and decrease the stream data counter according to the second output rate of the stream during a second period after the first period.

* * * * *